E. W. SPLITTSTOSER.
POTATO DIGGER.
APPLICATION FILED MAR. 23, 1917.

1,256,182.

Patented Feb. 12, 1918.
3 SHEETS—SHEET 1.

WITNESSES.
H. L. Opsahl.
E. C. Wells.

INVENTOR.
E. W. SPLITTSTOSER
BY HIS ATTORNEYS
Williamson & Merchant

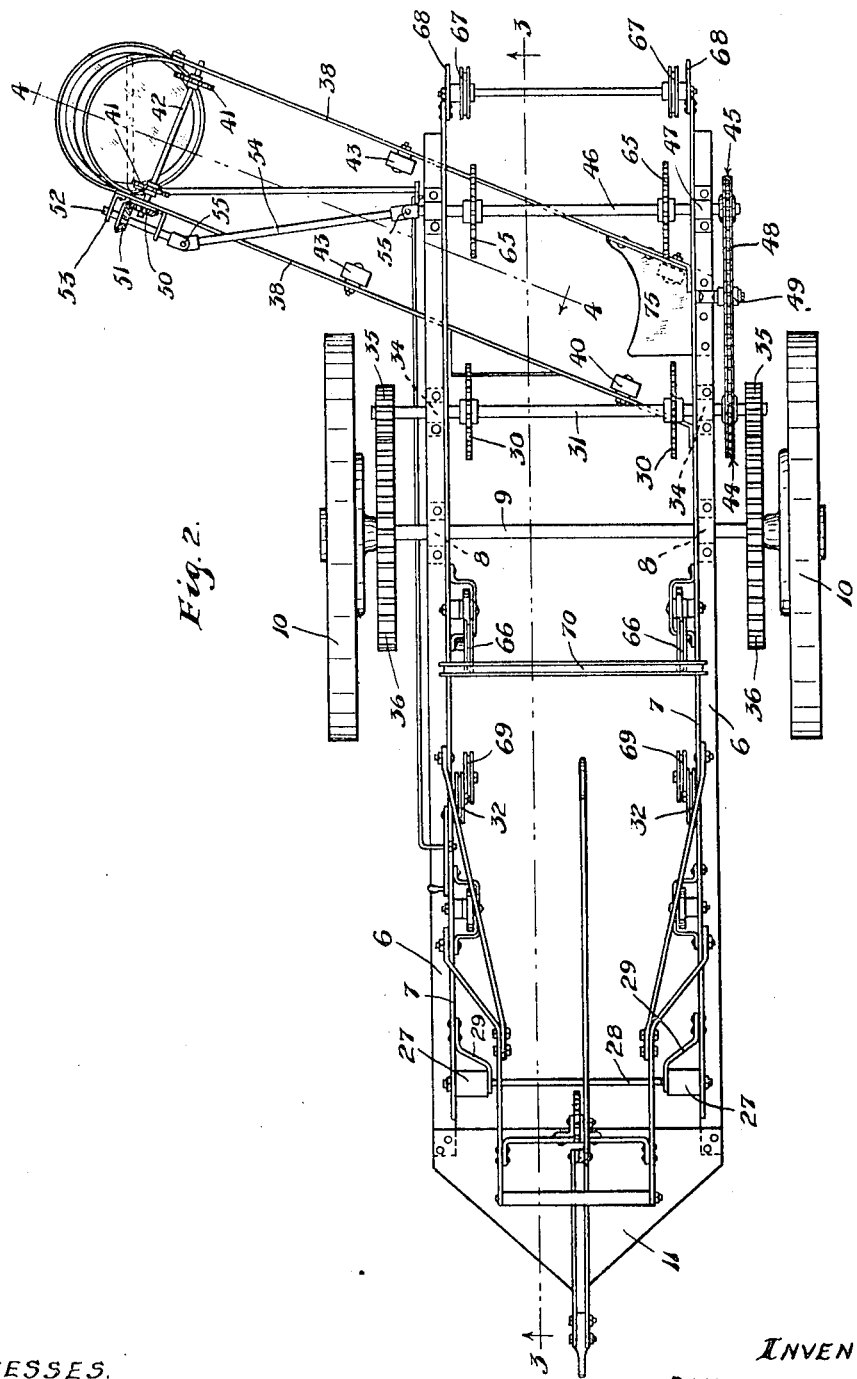

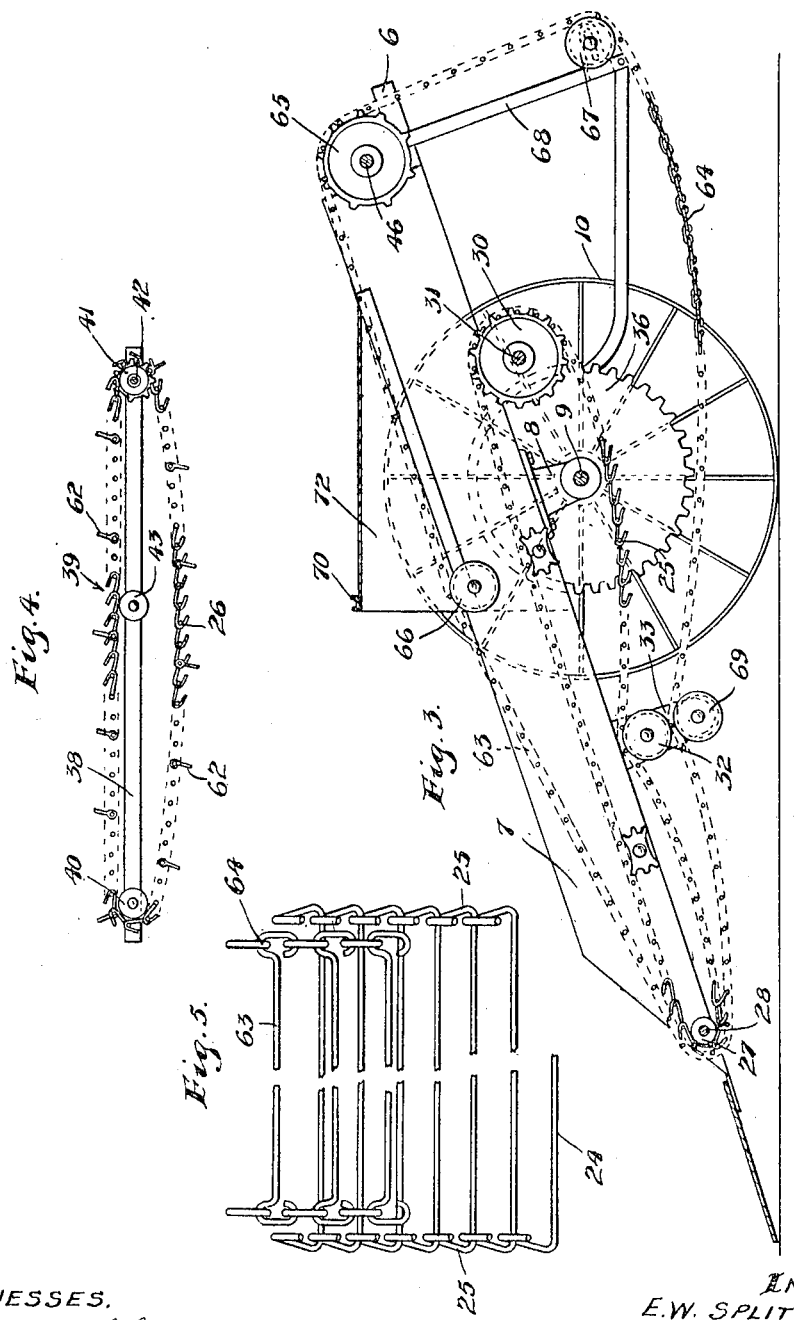

UNITED STATES PATENT OFFICE.

ERNEST W. SPLITTSTOSER, OF NORTH BRANCH, MINNESOTA.

POTATO-DIGGER.

1,256,182.   Specification of Letters Patent.   Patented Feb. 12, 1918.

Application filed March 23, 1917. Serial No. 156,899.

*To all whom it may concern:*

Be it known that I, ERNEST W. SPLITTSTOSER, a citizen of the United States, residing at North Branch, in the county of Chisago and State of Minnesota, have invented certain new and useful Improvements in Potato-Diggers; and I do hereby declare the following to be a full, clear, and exact description of the invention, such as will enable others skilled in the art to which it appertains to make and use the same.

My invention relates to improvements in potato diggers; and, to this end, it consists of the novel devices and combinations of devices hereinafter described and defined in the claims.

In the accompanying drawings, which illustrate the invention, like characters indicate like parts throughout the several views.

Referring to the drawings,

Fig. 2 is a plan view of the same with some parts removed;

Fig. 3 is a longitudinal vertical section taken on the line 3—3 of Fig. 2, with some parts diagrammatically illustrated by means of broken lines;

Fig. 4 is a vertical section taken on the line 4—4 of Fig. 2, with some parts diagrammatically illustrated by means of broken lines: and Fig. 5 is a fragmentary detail view of the conveyers.

Figure 1:
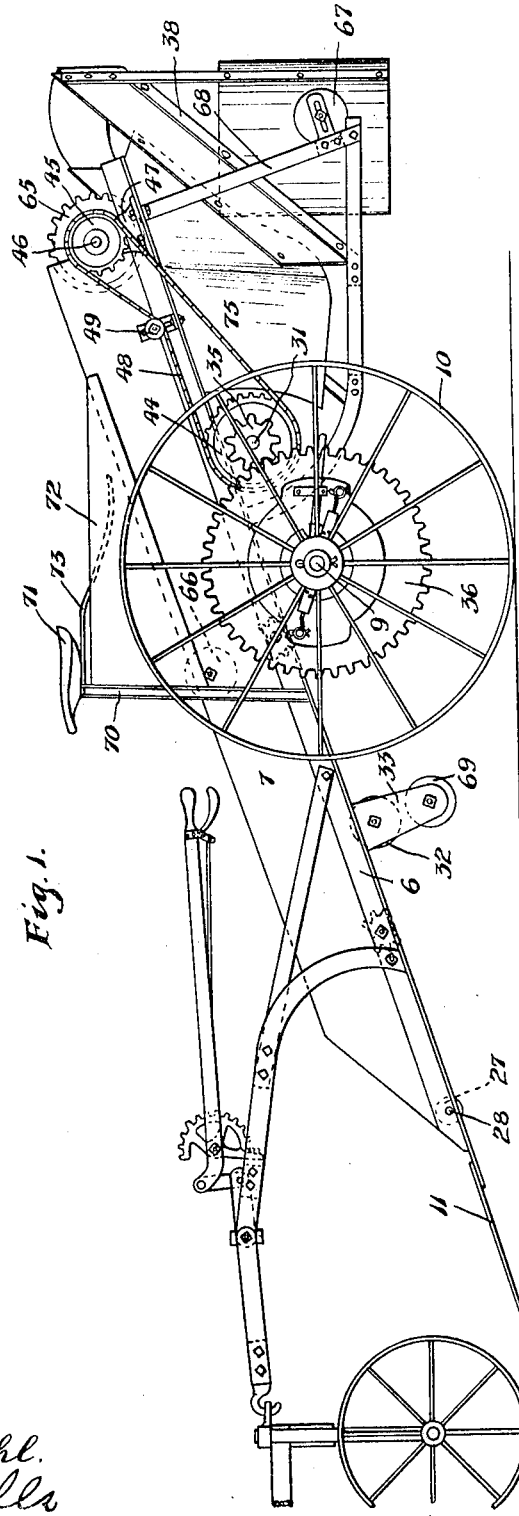
Figure 1 is a left side elevation of the improved potato digger.

The numeral 6 indicates a rearwardly and upwardly inclined skeleton frame having side plates 7 and depending bearings 8 in which is journaled a rear axle 9. To the outwardly projecting ends of this axle 9, is secured a pair of traction wheels 10. The axle 9 is located slightly forward of the longitudinal center of the frame 6, which frame has secured to its front end a forwardly projecting shovel plow 11.

A potato conveyer 24, comprising a plurality of laterally spaced rods bent and interlocked at their ends to form a pair of endless chains 25, is provided for receiving the potatoes, as they are dug up by the shovel plow 11, and conveying the same to the rear of the frame 6 and depositing said potatoes on an elevator 26. At the front of the frame 6, the chains 25 of the potato conveyer 24 run over a pair of idle smooth faced rollers 27 journaled on a rod 28, the ends of which are anchored in the side members of said frame. Brackets 29, secured to said side members and through which the rod 28 extends, are provided for holding the roller 27 against axial movement away from said side members. At the rear of the frame 6, the rods of the potato conveyer 24 run over a pair of sprocket wheels 30 secured to a shaft 31 for rotation therewith. The lower section of the potato conveyer 24 is supported on a pair of idle grooved wheels 32 journaled on depending bearings 33 secured to the frame 6.

The shaft 31 is journaled in depending bearings 34 on the frame 6 and has keyed to its outer projecting ends pinions 35, which mesh with gears 36 loosely journaled on the axle 9.

Secured to the rear end of the frame 6, is a skeleton frame 38 for the elevator 26. This elevator frame 38 extends at an angle to the frame 6 and projects in a rearwardly and upwardly inclined position. As shown, the elevator 26 comprises a multiplicity of laterally spaced rods, the ends of which are bent and interlocked to form a pair of endless chains 39. These chains 39 run over smooth faced rollers 40 journaled to the frame 38 at the receiving end thereof, and the rods of said elevator run over sprocket wheels 41 keyed to a shaft 42 journaled in the frame 38 at the rear end thereof. The upper section of the elevator 26, at its intermediate portion, runs over a pair of idle smooth faced guide rollers 43 journaled to the frame 38.

The shaft 42, and hence the elevator 26, are driven from the shaft 31 by the following connections:—

Keyed to the shaft 31, at the left hand end thereof, is a sprocket wheel 44, which is alined with a relatively small sprocket wheel 45 keyed to the left hand projecting end of a shaft 46 journaled in bearings 47 on the frame 6, at the rear end thereof. A sprocket chain 48 runs over the alined sprocket wheels 44 and 45 and a chain tightener 49 is provided therefor. Keyed to one end of the shaft 42, is a beveled gear 50, which meshes with a beveled gear 51 keyed to a short shaft 52 journaled in bearings 53 on the elevator frame 38. A rod 54 connects the right hand end of the shaft 46 to the shaft 52 and is provided with the necessary universal joints 55.

To certain of the rods of the elevator 26, are secured cleats 62, which prevent the potatoes from rolling from said elevator, as they are carried upward thereby.

To separate the vines, trash, etc., from the potatoes, I provide a refuse conveyer 63, which travels completely around the path traveled by the potato conveyer 24. This refuse conveyer 63, like the potato conveyer 24, is made up of a multiplicity of laterally spaced rods, the ends of which are bent and interlocked to form a pair of endless chains 64. By reference to Fig. 5, it will be noted that the refuse conveyer 63 has a width slightly less than that of the potato conveyer 24, so that its chains 64 run just inside of the chains 25.

The front or receiving end of the refuse conveyer 63 is supported and runs directly upon the rods of the conveyer 24, and its rear end runs over a pair of sprocket wheels 65 keyed for rotation with the shaft 46. A pair of idle grooved wheels 66 support the upper section of the refuse conveyer 63 and hold the same spaced above the upper section of the potato conveyer 24. These grooved wheels 66 are journaled to the side plates 7. From the sprocket wheels 65, the refuse conveyer 63 runs over chain tighteners 67, which hold the delivery end of said conveyer in a downwardly and rearwardly inclined position. These chain tighteners 67 are mounted on bracket-like structures 68 secured to and depending from the frame 6. The lower section of the refuse conveyer 63 is supported on and runs over a pair of grooved wheels 69 journaled on the brackets 33 below the grooved wheels 32.

Secured to the frame 6 and side plates 7, is a yoke-like bar 70 on the transverse portion of which is secured a seat 71 for the operator. A housing 72, open at both ends and through which the upper section of the refuse conveyer 63 travels, is secured to the side plates 7 and bar 70. This housing is tapered toward the delivery end of the refuse conveyer 63 and tends to compress the vines, weeds and trash on said conveyer. A rearwardly and downwardly extended spring-pressed plate 73 is secured to the bar 70 and presses said refuse on the refuse conveyer 63 into compact form.

The driving connections for the two conveyers 24 and 63 are so designed that the refuse conveyer 63 will be driven at a slightly increased speed over that of the potato conveyer 24. This difference in the traveling movement of the two conveyers is such that the same is offset and said two conveyers move together, while passing over the rollers 27, for the reason that said conveyers being mounted, the one upon the other, are at different distances from the axis of said rollers, thus causing the outer or refuse conveyer to travel farther than the potato conveyer. By thus causing the two conveyers to move together, while passing over the rollers 27, it is possible to prevent slippage, undue wear and strain at the point where the refuse conveyer 63 runs directly over and is supported by the potato conveyer 24. Clogs of dirt and sod, delivered from the shovel plow 11 onto the refuse conveyer 63, will be broken up under the parting action of the two conveyers 24 and 63, after passing over the rollers 27, and the different speeds at which they travel. The refuse conveyer 63 also prevents roots, vines, weeds, and bunches of grass from lodging on the potato conveyer, thereby making the separation and the cleaning of the potatoes more thorough. A deflecting plate 75, secured to the frames 6 and 38, is provided for directing the potatoes as they fall from the potato conveyer 24 onto the elevator 26.

The operation of the improved potato digger may be briefly described as follows:—

As the potatoes are dug up by the shovel plow 11, the same, together with the soil, vines, weeds and trash, will be crowded rearward from the shovel plow onto the refuse conveyer 63. The clogs of dirt and sod will first be broken by the conveyers 24 and 63, owing to the parting action thereof and to the different speeds at which they are driven. All of the potatoes, stones and dirt deposited on the refuse conveyer 63 will work between the rods thereof and be deposited on the underlying potato conveyer 24. The small potatoes, stones and dirt will work between the rods of the potato conveyer 24 and be deposited on the ground. The potatoes, remaining on the potato conveyer 24, will be delivered thereby onto the elevator 26.

Vines, weeds, trash, etc., remaining on the refuse conveyer 63, will be carried thereby into the housing 72 and while passing therethrough, will be compressed into compact form by the presser blade 73 and the rearwardly tapered top wall of the housing 72. From the housing 72, the compressed refuse will be carried over the rear end of the refuse conveyer 63 and be deposited on the ground, where the same may be either picked up, burned or otherwise disposed of.

The presser blade will also press through the refuse conveyer 63 any potatoes which may have lodged in the refuse or which are not ripe and still clinging to the vines.

What I claim is:—

1. In a digging machine, the combination with a wheel-supported frame and a shovel plow carried thereby, of an endless refuse conveyer and a potato conveyer mounted on said frame for traveling movement, the latter within the former, said refuse conveyer arranged to receive from the shovel plow, and means for driving said two conveyers at different speeds.

2. A structure as specified in claim 1, said two conveyers at their receiving ends being mounted to travel on arcs of different diameters which offsets the difference in speed therebetween and causes the same to move together.

3. In a digging machine, the combination with a wheel-supported frame and a shovel plow carried thereby, of an endless refuse conveyer and an endless potato conveyer mounted on said frame for traveling movement, the latter within the former, said refuse conveyer arranged to receive from said shovel plow, guides supporting the upper section of the refuse conveyer spaced above the potato conveyer, except at its receiving end portion where the same is supported directly on said potato conveyer, and means for driving said two conveyers.

4. A structure as specified in claim 3, said conveyers being driven at different speeds, the arcs of different diameters on which the receiving ends of said conveyers travel offsetting the difference in speed therebetween and causing said conveyers to move together at their receiving ends.

5. A structure as specified in claim 4, said refuse conveyer at the rear of the machine being guided in a rearwardly and downwardly inclined direction.

6. In a digging machine, the combination with a wheel-supported frame and a shovel plow carried thereby, of an endless refuse conveyer and an endless potato conveyer mounted on said frame for traveling movement, the latter within the former, said refuse conveyer arranged to receive from said shovel plow, each of said conveyers comprising a plurality of laterally spaced rods having their ends bent and interlocked to form a pair of chains, and means for driving said two conveyers.

7. A structure as specified in claim 6, guides supporting the upper section of the refuse conveyer spaced above the potato conveyer, except at its receiving end portion where the same is supported directly on said potato conveyer.

8. A structure as specified in claim 7, said refuse conveyer having a transverse width less than that of the potato conveyer so that the chains of said refuse conveyer will travel within the chains of the potato conveyer.

9. In a digging machine, the combination with a wheel-supported frame and a shovel plow carried thereby, of a roller journaled on the frame at its forward end, upper and lower pairs of sprocket wheels journaled on the frame at its rear end, an endless refuse conveyer and an endless potato conveyer arranged to travel courses, the latter within the former, said potato conveyer arranged to run on said roller and the lower pair of sprocket wheels and said refuse conveyer arranged to run on the potato conveyer, at a point where the same is passing over said roller, and on said upper pair of sprocket wheels, guides supporting the intermediate portion of the upper run of the refuse conveyer, and means for driving said two conveyers.

10. In a digging machine, the combination with a wheel-supported frame and a shovel plow carried thereby, of a roller journaled on the frame at its forward end, upper and lower pairs of driven sprocket wheels journaled on the frame at its rear end, an endless refuse conveyer and an endless potato conveyer arranged to travel courses, the latter within the former, said potato conveyer arranged to run on said roller and the lower pair of sprocket wheels and said refuse conveyer arranged to run on the potato conveyer, at a point where the same is passing over said roller and on said upper pair of sprocket wheels, and a guide roller supporting the refuse conveyer, after passing over the upper driven roller, in a rearwardly and downwardly inclined position.

11. In a digging machine, the combination with a wheel-supported frame and a shovel plow carried thereby, of an endless refuse conveyer and a potato conveyer mounted on said frame for traveling movement, the latter within the former, said refuse conveyer arranged to receive from the shovel plow, means for driving said two conveyers, and a packer for pressing the refuse onto the refuse conveyer.

12. In a digging machine, the combination with a wheel-supported frame and a shovel plow carried thereby, of an endless refuse conveyer and a potato conveyer mounted on said frame for traveling movement, the latter within the former, said refuse conveyer arranged to receive from the shovel plow, means for driving said two conveyers, and a housing having open ends through which the refuse conveyer travels, said housing being contracted toward the delivery end of the refuse conveyer.

13. A structure as specified in claim 12, and a spring-pressed packer in said housing for pressing the refuse onto the refuse conveyer.

In testimony whereof I affix my signature in presence of two witnesses.

ERNEST W. SPLITTSTOSER.

Witnesses:
FRANK W. ERICKSON,
E. W. MAGISSON.